Patented Oct. 24, 1933

1,931,892

UNITED STATES PATENT OFFICE 1,931,892

PROCESS OF MAKING A DEHYDRATED FLOUR MIXTURE

John D. Duff, Pittsburgh, and Louis E. Dietrich, Crafton, Pa., assignors to P. Duff & Sons, Inc., a corporation of Pennsylvania No Drawing. Application December 10, 1930
Serial No. 501,468

5 Claims. (Cl. 99—10)

This invention relates to a dehydrated flour for use in making pastry products and to a process of making the same.

In the ordinary preparation of pastry products there are a large and varied number of ingredients which must be used which means keeping a complete stock of materials on hand. This is not only expensive and inconvenient, but necessitates careful measurements and mixing and, therefore, the provision of suitable apparatus therefor. In addition to the above, unsatisfactory results or failures occur too frequently which represent a serious loss of time, of money, of materials and of energy.

One of the objects of the present invention is to achieve the making of pastry products in an extremely simple and economical manner without the possibility of unsatisfactory results or failures.

Another object is to provide an article of commerce containing all the designated ingredients in a dry form and from which consequently the pastry product can be made merely by moistening and cooking.

A further object is to provide a dehydrated flour mixture which requires the addition of nothing but water and heat to convert it into a pastry product, thereby eliminating the maintenance of a stock of materials and apparatus together with the elimination of uncertainty of result.

Other and further objects will be understood by those skilled in this art or will be pointed out hereinafter.

We, therefore, form our mixture from the ingredients required for the manufacture of a dehydrated flour which contains those elements which will, in a particular instance, make the desired product when water in any form, or milk, and the like is added thereto and the whole baked or otherwise suitably cooked.

As a particular example, we have invented a dehydrated flour for making ginger bread and we will use this purely as an illustration of our product and process. In a typical instance, we make use of the following ingredients.

|                      | Pounds | Percent |
|----------------------|--------|---------|
| Wheat flour          | 100    | 43.0    |
| Molasses             | 100    | 43.0    |
| Sugar                | 11     | 4.8     |
| Shortening           | 11     | 4.8     |
| Salt                 | ½      | 0.2     |
| Baking soda          | 3      | 1.3     |
| Powdered whole egg   | 6      | 2.6     |
| Powdered ginger      | ½      | 0.2     |
| Powdered cinnamon    | ¼      | 0.1     |

The amounts of these ingredients are not to be considered as restricted solely to the above percentages as any or all of them can be varied within rather wide limits so that the formula must be considered as giving merely the idea involved rather than any limitation as to the exact ingredients or their amounts.

The above ingredients are preferably mixed in a manner which we shall describe and wherein the molasses, shortening, sugar and salt are put in the bowl of a dough mixing machine wherein they are constantly agitated while heat is simultaneously applied thereto, the application of the heat being made in any convenient way such as by the insertion of a steam coil into the bowl of the mixing machine. The temperature of the mixture is allowed to rise until the shortening is thoroughly melted. It is to be understood that agitation has been taking place all during this time and that the sugar and salt have dissolved into the molasses. The melted fat and the solution of sugar and salt in molasses form an emulsion which is made very uniform by the agitation and consequently a very homogeneous mixture of the materials so far added is obtained.

When such a condition has been reached the heating is then discontinued and the flour added to the above named homogeneous mixture while the kneading appliance is in operation. The flour can be added gradually and is preferably so added and when completely added a dough is formed which contains the first five ingredients of the above formula.

The next step is to dry the dough. This may be done in a variety of ways. We may roll the dough into a thin sheet which is dried by subjecting it to the influence of a blast of warm air, or we may divide the dough mechanically into small lumps which may be placed on trays or dried in a suitable heated drying cabinet. We may also force the dough through steel dies to form thin strands or ribbons, like spaghetti, and these strands or ribbons may be dried in a suitable apparatus.

However the dough is dried, it is next ground to a powder and this may be done in a variety of types of grinding mill, the important requisite being that it be reduced to a suitable state of fineness and we have found that a state of division such that it will pass through a twenty-mesh sieve is satisfactory.

This powder having been formed, the manufacture of the flour mixture is practically complete as all that is then required is to simply mix in the remaining ingredients thoroughly which are all dry and in a suitable state of subdivision. This may conveniently be done by spreading out the dried flour on a flat surface and sprinkling on top thereof the baking soda, powdered egg and spices which may then be thoroughly mixed by raking or scoping, or if we prefer we can place all the materials in a suitable revolving mixing drum. This mixture is sold as a new article of commerce and the same is used by adding water or milk and then baking or cooking in the usual manner.

In considering the above description it must be understood that various modifications of procedure are contemplated. For example, the same final results would be obtained by making the powdered dough from the molasses, shortening and flour alone leaving the sugar and salt to be added later with the baking soda, powdered egg and spices. Other variations of procedure are contemplated and hence the above is to be taken as illustrative and not in a limitative manner. It is plain that a variety of types of flours can be made from which different sorts of pastry products or cakes would result and these can be easily accomplished without departing from the spirit and scope of our invention. In this connection, for example, a flour for making brown bread can be produced by substituting a brown bread flour for wheat flour and varying the percentage of the shortening together with the omission of certain of the flavoring agents, if so desired. Similarly a spice cake could be prepared by means of certain changes in the ingredients such as adding the proper spices to the formula.

For the shortening, we may use a hydrogenated edible vegetable oil or fat or a suitable animal fat, such as lard, and this may be in semi-solid or liquid form and of high grade. It need not necessarily be hydrogenated.

What we claim as new and desire to secure by Letters Patent is:

1. The process of making a dehydrated uncooked flour including the steps of forming a stable emulsion containing molasses and shortening, adding flour to make a conglutinate dough, kneading said dough, and drying and powdering the same, thereafter mixing in predetermined dry ingredients.

2. The process of making a dehydrated uncooked gingerbread flour including the steps of mixing molasses, shortening, sugar and salt and simultaneously heating and agitating the same, whereby the sugar and salt dissolve in the molasses and the shortening melts, forming a homogeneous emulsion with the agitated and heated shortening and molasses, discontinuing said heating, adding flour, and forming a kneaded conglutinate dough from these ingredients, drying said dough without cooking it, grinding it to powder, and mixing in baking soda, powdered whole egg, powdered ginger and powdered cinnamon.

3. The steps of making a hard dry mass adapted to be converted into a product from which a pastry product can be made by adding moisture and cooking, comprising the steps of forming an emulsion of molasses and shortening, adding flour thereto to make a dough and subsequently drying the dough to form the hard dry mass aforesaid.

4. The steps of making a hard dry mass adapted to be converted into a mix from which a pastry product can be made by adding moisture and cooking comprising the steps of forming an emulsion of molasses and shortening, adding flour thereto to make a dough and subsequently drying the dough to form the hard dry mass aforesaid; thereafter grinding said hard mass and mixing in predetermined dry ingredients to complete the mix.

5. A method of preparing a molasses-cake flour adapted to be subsequently baked into an edible product, consisting in first mixing molasses and a shortening under the action of heat to thereby produce an emulsion in which the shortening is melted and thoroughly incorporated in the molasses, then adding a sufficient quantity of flour to said emulsion to make a dough, the flour being thoroughly stirred into the emulsion while the same is heated, and then reducing said dough to a dry powder condition and adding thereto in a dry form a gasifying agent.

JOHN D. DUFF.
LOUIS E. DIETRICH.